US009818536B2

(12) United States Patent
Suzuki et al.

(10) Patent No.: US 9,818,536 B2
(45) Date of Patent: Nov. 14, 2017

(54) MULTILAYER CERAMIC CAPACITOR AND METHOD OF MANUFACTURING MULTILAYER CERAMIC CAPACITOR

(71) Applicant: Murata Manufacturing Co., Ltd., Nagaokakyo-shi, Kyoto-fu (JP)

(72) Inventors: Shoichiro Suzuki, Nagaokakyo (JP); Shinichi Yamaguchi, Nagaokakyo (JP); Akitaka Doi, Nagaokakyo (JP)

(73) Assignee: MURATA MANUFACTURING CO., LTD., Nagaokakyo-Shi, Kyot-Fu (JP)

( * ) Notice: Subject to any disclaimer, the term of this patent is extended or adjusted under 35 U.S.C. 154(b) by 0 days.

(21) Appl. No.: 15/171,059

(22) Filed: Jun. 2, 2016

(65) Prior Publication Data

US 2016/0276102 A1    Sep. 22, 2016

Related U.S. Application Data

(63) Continuation of application No. PCT/JP2014/080889, filed on Nov. 21, 2014.

(30) Foreign Application Priority Data

Dec. 10, 2013 (JP) .................................. 2013-254923

(51) Int. Cl.
*H01G 4/005* (2006.01)
*H01G 4/008* (2006.01)
(Continued)

(52) U.S. Cl.
CPC .......... *H01G 4/008* (2013.01); *H01G 4/1227* (2013.01); *H01G 4/232* (2013.01); *H01G 4/30* (2013.01); *H01G 4/0085* (2013.01)

(58) Field of Classification Search
CPC ....... H01G 4/005; H01G 4/008; H01G 4/0085
See application file for complete search history.

(56) References Cited

U.S. PATENT DOCUMENTS

2006/0021465 A1* 2/2006 Uchida ............... B22F 1/0059
  75/252
2010/0208410 A1* 8/2010 Okada ............... B22F 1/0011
  361/301.4
(Continued)

FOREIGN PATENT DOCUMENTS

JP   H05290622 A   11/1993
JP   H07326535 A   12/1995
(Continued)

OTHER PUBLICATIONS

International Search Report issued for PCT/JP2014/080889, dated Feb. 24, 2015.
(Continued)

*Primary Examiner* — Eric Thomas
(74) *Attorney, Agent, or Firm* — Arent Fox LLP

(57) ABSTRACT

A multilayer ceramic capacitor that includes an internal electrode containing at least one kind of metal A selected from the group consisting of In, Ga, Zn, Bi, and Pb and dissolved in Ni to form a solid solution. The internal electrode has a ratio of A of 1.4 atomic percent or more to a total amount of A and Ni in a near-interface region located to a depth of 2 nm from a surface of the internal electrode facing a corresponding ceramic dielectric layer. A relation between a value X of atomic percent representing the ratio of A in the near-interface region and a value Y of atomic percent representing the ratio of A in a central region in a thickness direction of the internal electrode is X−Y≥1.0. Such a multilayer capacitor is formed by annealing a ceramic stack under a predetermined condition to increase the ratio of metal A in the near-interface region of the internal electrode.

11 Claims, 2 Drawing Sheets

(51) Int. Cl.
    *H01G 4/30*           (2006.01)
    *H01G 4/232*        (2006.01)
    *H01G 4/12*           (2006.01)

(56) References Cited

U.S. PATENT DOCUMENTS

2013/0321980 A1   12/2013  Suzuki et al.
2015/0155098 A1    6/2015  Yamaguchi et al.

FOREIGN PATENT DOCUMENTS

| | | |
|---|---|---|
| JP | H11283867 A | 10/1999 |
| JP | 2013098312 A | 5/2013 |
| WO | WO 2012111592 A1 | 8/2012 |
| WO | WO 2014024538 A1 | 2/2014 |

OTHER PUBLICATIONS

Written Opinion of the International Searching Authority issued for PCT/JP2014/080889, dated Feb. 24, 2015.

\* cited by examiner

MULTILAYER CERAMIC CAPACITOR AND METHOD OF MANUFACTURING MULTILAYER CERAMIC CAPACITOR

CROSS REFERENCE TO RELATED APPLICATIONS

The present application is a continuation of International application No. PCT/JP2014/080889, filed Nov. 21, 2014, which claims priority to Japanese Patent Application No. 2013-254923, filed Dec. 10, 2013, the entire contents of each of which are incorporated herein by reference.

FIELD OF THE INVENTION

The present invention relates to a multilayer ceramic capacitor having a structure in which internal electrodes are disposed to face each other with a dielectric ceramic layer interposed therebetween, and to a method of manufacturing a multilayer ceramic capacitor.

BACKGROUND OF THE INVENTION

With the recent progress of the electronics technology, a multilayer ceramic capacitor is required to be reduced in size and increased in capacitance. In order to satisfy these requirements, the thickness of ceramic dielectric layers forming the multilayer ceramic capacitor has been reduced.

However, reduction of the thickness of the ceramic dielectric layers leads to relative increase of the electric field intensity applied to each layer. Accordingly, improvements of the durability and the reliability during application of a voltage are required.

As such a multilayer ceramic capacitor, a multilayer ceramic capacitor is known that includes, for example, a stack and a plurality of external electrodes. The stack has a plurality of stacked ceramic dielectric layers and a plurality of internal electrodes formed along interfaces between the ceramic dielectric layers. The plurality of external electrodes are formed on an outer surface of the stack and electrically connected to the internal electrodes (see PTD 1). PTD 1 discloses an internal electrode containing Ni as a main component, in the multilayer ceramic capacitor.

PTD 1: Japanese Patent Laying-Open No. 11-283867

SUMMARY OF THE INVENTION

However, the above-referenced multilayer ceramic capacitor of PTD 1 including the internal electrodes containing Ni as a main component is not necessarily sufficient in high-temperature load life. In fact, there is a demand for development of a multilayer ceramic capacitor having a still longer high-temperature load life and excellent durability.

The present invention has been made to solve the above-described problems, and an object of the present invention is to provide a multilayer ceramic capacitor which has a sufficient high-temperature load life even when the ceramic dielectric layers are further reduced in thickness and which has a large obtainable electrostatic capacitance, and to provide a method of manufacturing such a multilayer ceramic.

With the aim of solving the above-described problems, a multilayer ceramic capacitor of the present invention includes a ceramic stack having a plurality of ceramic dielectric layers and a plurality of internal electrodes, each respective internal electrode of the plurality of internal electrodes being interposed between adjacent ceramic dielectric layers of the plurality of ceramic dielectric layers in the ceramic stack; and an external electrode on an outer surface of the ceramic stack and electrically connected to the internal electrodes.

The internal electrodes contain a solid solution of a Ni-A alloy, wherein A is at least one kind of metal selected from the group consisting of In, Ga, Zn, Bi, and Pb. Each internal electrode of the plurality of internal electrodes have a ratio of A of 1.4 atomic percent or more to a total amount of A and Ni in a near-interface region, the near-interface region being located from a surface of the respective internal electrode to a depth of 2 nm therefrom, the surface of the respective internal electrode being a surface thereof facing a corresponding one of the plurality of ceramic dielectric layers. Further, a relation between a value X of atomic percent representing the ratio of A in the near-interface region and a value Y of atomic percent representing the ratio of A in a central region in a thickness direction of the internal electrode satisfies a requirement represented by an expression (1):

$$X-Y \geq 1.0 \quad (1).$$

Moreover, regarding the multilayer ceramic capacitor of the present invention, preferably the central region in the thickness direction is located at 0.2T or more inward in the thickness direction from each of one surface and the other surface of the internal electrode, where T is a thickness of the internal electrode.

In the case where the central region in the thickness direction is defined in this way, the above-described requirement of the present invention: $X-Y \geq 1.0$ is satisfied. Accordingly, even when the thickness of the ceramic dielectric layer is further reduced, the multilayer ceramic capacitor having a sufficient high-temperature load life and excellent durability can be provided.

While the above-defined range of the region (the region in the internal electrode, the region located at 0.2T or more inward from each of one surface and the other surface of the internal electrode) is a specifically defined region of the present invention, the central region in the thickness direction may be broader than the above-defined region for the following reason. Namely, while the ratio of metal A in the near-interface region of the internal electrode contributes to improvement of the high-temperature load life, the internal region (located inside the interface region) of the internal electrode does not contribute to improvement of the high-temperature load life.

A method of manufacturing a multilayer ceramic capacitor of the present invention includes the steps of forming a un-fired ceramic stack having a plurality of un-fired ceramic dielectric layers and a plurality of un-fired internal electrode patterns, the plurality of un-fired internal electrode patterns being formed by applying an electrically conductive paste along a plurality of interfaces between the un-fired ceramic dielectric layers, the electrically conductive paste containing an Ni component and at least one kind of metal A component selected from the group consisting of In, Ga, Zn, Bi, and Pb; firing the un-fired ceramic stack to obtain a fired ceramic stack; and annealing the fired ceramic stack under a predetermined condition to increase the ratio of A in the near-interface region located from the surface of the internal electrode to a depth of 2 nm therefrom, the surface of the internal electrode being a surface facing the corresponding one of the ceramic dielectric layers.

In the multilayer ceramic capacitor of the present invention, even when the thickness of the ceramic dielectric layer is further reduced, the multilayer ceramic capacitor having a sufficient high-temperature load life and excellent durability can be provided.

It should be noted that each of X and Y which is "a value of atomic percent representing the ratio of A" is a value expressed in percentage and representing a ratio of the number of atoms of A to the total of the number of atoms of A and the number of atoms of Ni.

Namely, X or Y is a value determined by the following expression (2):

$$\{\text{number of atoms of A}/(\text{number of atoms of A}+\text{number of atoms of Ni})\} \times 100 \quad (2).$$

It should be noted that in the case where the ratio of Ni and the ratio of A are each given as a value in mass percent, the value of the mass percent may be divided by the atomic weight, namely the value of (value of mass percent of Ni/value of atomic weight of Ni) and the value of (value of mass percent of A/value of atomic weight of A) may be determined, and then the ratio of A (value of atomic percent) may be determined.

More specifically, the multilayer ceramic capacitor of the present invention has the characteristic features:

(a) the internal electrode has an electrode structure in which at least one kind of metal A selected from the group consisting of In, Ga, Zn, Bi, and Pb is dissolved to form a solid solution;

(b) in the multilayer ceramic capacitor of the present invention, the internal electrode is formed of an alloy of Ni and metal A (at least one kind of metal selected from the group consisting of In, Ga, Zn, Bi, and Pb); and (c) in the internal electrode forming the multilayer ceramic capacitor of the present invention, the concentration of at least one kind of metal A selected from In, Ga, Zn, Bi, and Pb is higher in a region (near-interface region) located to a depth of 2 nm from a surface of the internal electrode, the surface being a surface facing a corresponding ceramic dielectric layer, than in a central region in the thickness direction of the internal electrode (hereinafter also referred to as "internal region"), and the ratio of A in the near-interface region is a certain ratio (concentration) or more.

In the multilayer ceramic capacitor of the present invention having the above-described features, the internal electrode is alloyed like Ni—In, Ni—Ga, Ni—Bi, Ni—Zn, Ni—Pb or the like, and the ratio of the alloy is higher in the near-interface region than in the other region. Thus, the condition (height of the electrical barrier) of the internal electrode in the vicinity of the interface between the internal electrode and the ceramic dielectric layer changes to contribute to improvement of the high-temperature load life.

Namely, the high ratio of an alloy such as Ni—In, Ni—Ga, Ni—Bi, Ni—Zn, Ni—Pb or the like particularly in the near-interface region of the internal electrode is an important key to improvement of the high-temperature load life.

In contrast, the internal region of the internal electrode (region located inside the interface region) does not contribute to improvement of the high-temperature load life, and therefore an alloy such as Ni—In, Ni—Ga, Ni—Bi, Ni—Zn, Ni—Pb or the like is not necessarily required to be present in this internal region.

The reason is not clear why the high ratio of the metal (element) (In, Ga, Zn, Bi, and Pb) forming the above-described alloy in the near-interface region enables a high electrostatic capacitance to be obtained. This reason, however, is presumed to be the fact that there is a difference in lattice constant of crystal lattice between the near-interface region of the internal electrode and the internal region (central region in the thickness direction of the internal electrode) and this difference causes change of the state of distribution of the residual stress in the multilayer ceramic capacitor.

Moreover, regarding the aforementioned features (a) and (b), the fact that the internal electrode has an electrode structure in which In, Ga, Zn, Bi, or Pb is dissolved to form a solid solution and the fact that the internal electrode is formed of an alloy such as Ni—In, Ni—Ga, Ni—Bi, Ni—Zn, Ni—Pb, or the like can be confirmed by XRD (X-ray diffraction method) or WDX (wavelength-dispersive X-ray spectroscopy).

Moreover, regarding the aforementioned feature (c), the fact that the concentration of at least one kind of metal A selected from In, Ga, Zn, Bi, and Pb is higher in the near-interface region of the internal electrode than in the internal region (central region in the thickness direction) of the internal electrode and the ratio of A in the near-interface region is a certain ratio or more can be confirmed by TEM-EDX (energy dispersive X-ray spectroscopy).

Moreover, the method of manufacturing a multilayer ceramic capacitor of the present invention includes the step of annealing the fired ceramic stack under a predetermined condition to increase the ratio of metal A in the near-interface region located to a depth of 2 nm from a surface of the internal electrode, the surface being a facing a corresponding ceramic dielectric layer. Therefore, the multilayer ceramic capacitor of the present invention having the above-described features can reliably and efficiently be manufactured.

DETAILED DESCRIPTION OF THE PREFERRED EMBODIMENTS

In the following, the features of the present invention will be further detailed with reference to embodiments of the present invention.

First Embodiment

<Structure of Multilayer Ceramic Capacitor>

Figure 1:
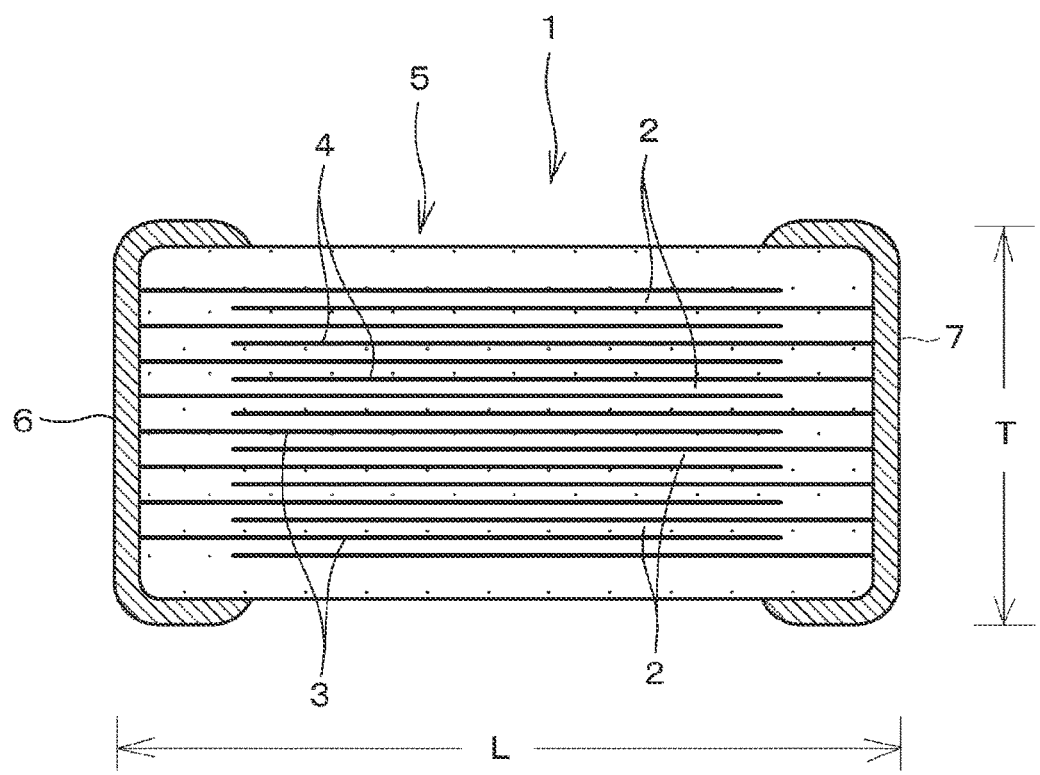
FIG. 1 is a front cross-sectional view showing a structure of a multilayer ceramic capacitor according to an embodiment of the present invention.

FIG. 1 is a front cross-sectional view showing a structure of a multilayer ceramic capacitor according to one embodiment (first embodiment) of the present invention.

This multilayer ceramic capacitor 1 includes a ceramic stack 5. Ceramic stack 5 includes a plurality of stacked ceramic dielectric layers 2, and a plurality of internal electrodes 3, 4 interposed between ceramic dielectric layers 2 in ceramic stack 5 so that internal electrodes 3 and 4 face each other with ceramic dielectric layer 2 interposed therebetween. It should be noted that internal electrodes 3, 4 disposed in ceramic dielectric layers 2 are alternately drawn to one end face and the opposite end face of ceramic stack 5.

On respective end faces, which are opposite to each other, of ceramic stack 5, external electrodes 6, 7 are disposed to be electrically connected to internal electrodes 3, 4.

It should be noted that a material containing Ag or Cu as a main component for example may be used as an electrically conductive material forming external electrodes 6, 7.

It should be noted that while multilayer ceramic capacitor 1 in the first embodiment is of two-terminal type having two external electrodes, the present invention is also applicable to a multilayer ceramic capacitor of a multi-terminal type having a plurality of external electrodes.

In this multilayer ceramic capacitor 1, internal electrodes 3, 4 are each an electrode containing, as a main component, an alloy of any metal (element) A which is selected from In, Ga, Zn, Bi, and Pb and dissolved in Ni to form a solid solution (Ni-A alloy).

Internal electrodes 3, 4 each have a ratio of A of 1.4 atomic percent or more to a total amount of the aforementioned metal A and Ni in a region (near-interface region) located to a depth of 2 nm from a surface of the internal electrode, the surface being a surface facing a corresponding ceramic dielectric layer 2, and a relation between a value X of atomic percent representing the ratio of A in the near-interface region and a value Y of atomic percent representing the ratio of A in a central region in a thickness direction of the internal electrode satisfies a requirement represented by an expression (1):

$$X - Y \geq 1.0 \tag{1}.$$

With the above-described features, multilayer ceramic capacitor 1 having a long high-temperature load life and high reliability can be obtained.

<Manufacture of Multilayer Ceramic Capacitor>

A description will now be given of a method of manufacturing multilayer ceramic capacitor 1 according to one embodiment (first embodiment) of the present invention.

(1) First, a predetermined amount of $BaCO_3$ powder and a predetermined amount of TiO2 powder were weighed as raw materials for a perovskite-type compound containing Ti and Ba. Then, the weighed powders were mixed with a ball mill and thereafter heat-treated under a predetermined condition. Accordingly, barium titanate-based perovskite-type compound powder which is a main component of the material forming the ceramic dielectric layer was obtained.

(2) Next, Dy203 powder, MgO powder, MnO powder, and $SiO_2$ powder which were sub-components were prepared. With respect to 100 parts by mol of the aforementioned main component, 0.75 parts by mol of $Dy_2O_3$, 1 part by mol of MgO, 0.2 parts by mol of MnO, and 1 part by mol of $SiO_2$ were weighed. These powders were blended with the main component, namely barium titanate-based perovskite-type compound powder, and they were mixed with a ball mill for a certain time, dried, and thereafter subjected to dry grinding. Accordingly, raw material powder was obtained.

(3) Then, to this raw material powder, polyvinyl butyral-based binder and an organic solvent such as ethanol were added. They were wet-mixed with a ball mill to thereby prepare a slurry. This ceramic slurry was subjected to sheet forming in accordance with the doctor blade method. Accordingly, a ceramic green sheet having a thickness of 2.8 µm was obtained. It should be noted that this ceramic green sheet is fired to thereafter become a dielectric ceramic layer.

(4) In accordance with the following method, an electrically conductive paste to form an internal electrode was prepared. Powder of an alloy of Ni powder and the aforementioned metal A (at least one kind selected from In, Ga, Zn, Bi, and Pb) was prepared as electrically conductive powder (Ni-A alloy powder). In the first embodiment, an alloy which was produced in advance so that the ratio of metal A to the total amount of Ni and metal A was 1 mass % as shown in Table 1 and processed into a powder form was obtained and used as the Ni-A alloy powder.

It should be noted that instead of using the Ni-A alloy powder produced in advance, any of various metal powders blended at a predetermined ratio to form an Ni-A alloy may be used in a heat treatment process.

Then, to the electrically conductive powder, polyvinyl butyral-based binder and an organic solvent such as ethanol were added. They were wet-mixed with a ball mill. Accordingly, an electrically conductive paste was produced.

(5) Next, the electrically conductive paste was printed in a predetermined pattern on the ceramic green sheet produced in the above-described manner. After fired, the electrically conductive paste formed an electrically conductive paste layer (internal electrode pattern) forming an internal electrode after fired.

(6) Then, a plurality of ceramic green sheets each having the internal electrode pattern formed thereon were stacked so that the internal electrodes are alternately drawn to one side and the other opposite side. Accordingly, an un-fired ceramic stack was obtained.

(7) Next, this ceramic stack was heated in an $N_2$ atmosphere to 350° C. to burn the binder. After this, in a reducing atmosphere of $H_2$—$N_2$—$H_2O$ gas at an oxygen partial pressure of $10^{-10}$ to $10^{-12}$ MPa, the temperature was raised at a rate of 20° C./min and the ceramic stack was fired at 1200° C. for 20 minutes.

(8) After this, in an atmosphere at an oxygen partial pressure of $10^{-12}$ to $10^{-15}$ MPa and a temperature of 800 to 1000° C., annealing was performed for one to four hours. In the first embodiment, the conditions of the annealing were used to adjust the amount of metal A of the internal electrode that is thickened in the vicinity of the interface between the internal electrode and the ceramic dielectric.

Specifically, for the multilayer ceramic capacitor including the internal electrode like that of the first embodiment, increase of the annealing temperature causes increase of the amount of metal A present in the near-interface region of the internal electrode.

(9) Next, to each of both end faces of the obtained ceramic stack, an Ag paste containing $B_2O_3$—$SiO_2$—BaO-based glass frit was applied and baked in an $N_2$ atmosphere at a temperature of 600° C. to thereby form an external electrode electrically connected to the internal electrodes.

In this way, multilayer ceramic capacitors 1 (samples with sample numbers 1 to 12 in Table 1) having the structure as shown in FIG. 1 were obtained.

Regarding the dimensions of the outer shape of each multilayer ceramic capacitor produced in this way, the width was 1.2 mm, the length was 2.0 mm, the thickness was 1.1 mm, and the thickness of a ceramic dielectric layer interposed between internal electrodes was 2.2 µm. The total number of effective dielectric ceramic layers was 300, and the facing-electrode area of each layer was $1.6 \times 10^{-6}$ $m^2$.

The samples with sample numbers 1, 4, 7, and 10 corresponding to respective sample numbers to which * is added in Table 1 are samples provided as comparative examples failing to satisfy the requirements of the present invention, while the samples with sample numbers 2, 3, 5, 6, 8, 9, 11, and 12 corresponding to respective sample numbers without * in Table 1 are samples satisfying the requirements of the present invention.

It should be noted that the sample with sample number 1 in Table 1 is a sample in which the internal electrode does not contain the aforementioned metal A (at least one kind selected from In, Ga, Zn, Bi, and Pb), and the samples with sample numbers 4, 7, and 10 are each a sample in which the ratio of metal A in the near-interface region of the internal electrode is less than 1.4 atomic percent and therefore these samples do not satisfy the requirements of the present invention.

<Evaluation of Characteristics>

(1) Electrostatic Capacitance

From the produced samples, ten samples were sampled for each sample number. An automatic bridge-type meter was used to measure the electrostatic capacitance obtained in each sample at an AC voltage of 1 Vrms and 1 kHz. The results are shown in Table 1.

(2) MTTF (Mean Time To Failure)

Each sample for which the electrostatic capacitance was measured in the manner described above in (1) was further subjected to a high-temperature load test under the conditions of 165° C. and 7.5 V, and the time when the insulation resistance became 10 KΩ or less was identified as failure time. From this failure time, MTTF was calculated and a comparison was made. The results are shown in Table 1.

(3) Confirmation of the Presence of Metal A in Internal Electrode

Moreover, for each sample (multilayer ceramic capacitor) in Table 1 that was produced in the above-described manner, the presence of metal A in the internal electrode was confirmed by the method described in the following.

(3-1) Polishing

Each sample was held in a posture so that the length (L) direction was along the vertical direction, the periphery of the sample was coated with resin, and a WT surface defined by the width (W) and the thickness (T) of the sample was exposed from the resin.

Then, a polishing machine was used to polish the WT surface of each sample. Each sample was polished to approximately a half of the depth in the length (L) direction of the sample. In order to eliminate unevenness of the internal electrode caused by the polishing, the polished surface was treated by ion milling after polishing.

(3-2) Mapping Analysis for Internal Electrode

Figure 2:
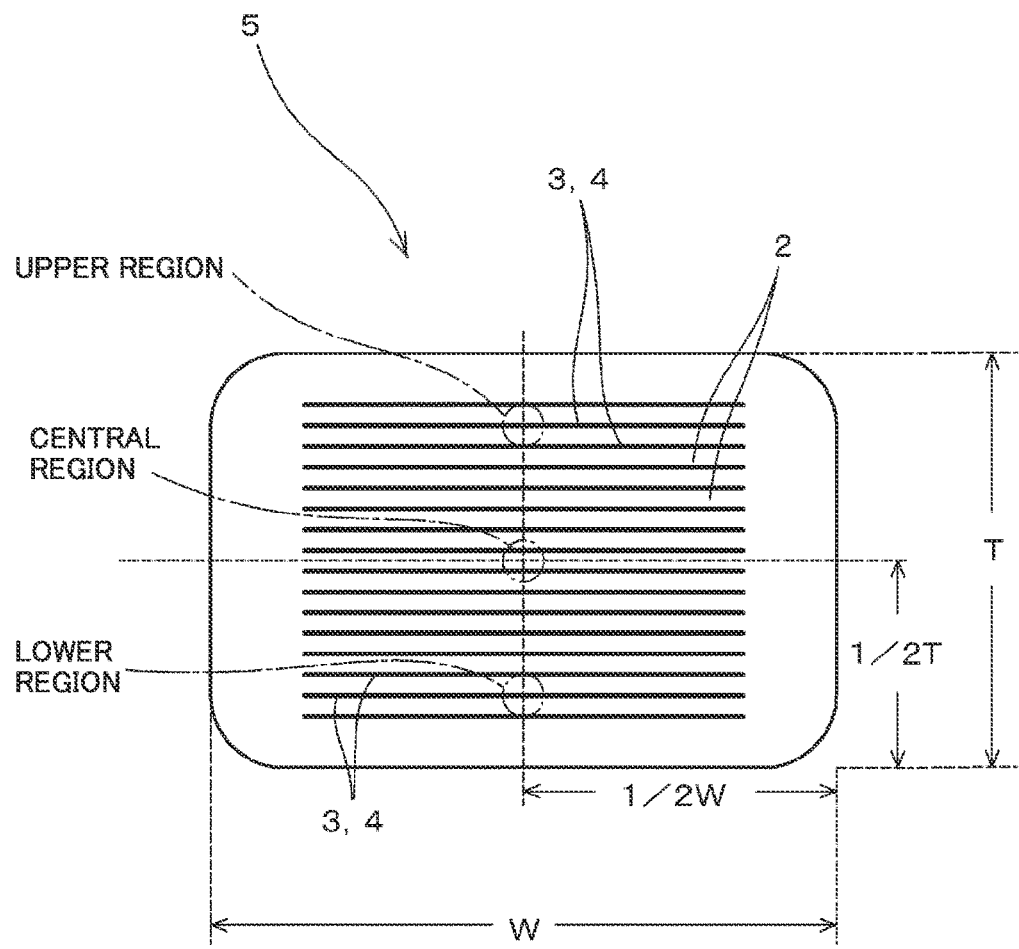
FIG. 2 is a diagram indicating where mapping analysis of Ni and metal A is conducted by WDX for the internal electrode forming a multilayer ceramic capacitor according to an embodiment of the present invention.

Then, as shown in FIG. 2, mapping analysis of Ni and metal A was conducted based on WDX (wavelength-dispersive X-ray spectroscopy) for three regions in a WT cross section at a position of approximately a half in the L direction as shown in FIG. 2. The three regions are a central region in the thickness (T) direction, and respective regions near upper and lower external layer portions (ineffective portions) (upper region and lower region), in the region where the internal electrodes are stacked.

As a result, it was confirmed that metal A was present in the internal electrode in each of samples (samples with sample numbers 2 to 12) in which the internal electrode was formed from the electrically conductive paste containing metal A.

(4) Confirmation that Metal A Contained in Internal Electrode is Alloyed with Ni The fired multilayer ceramic capacitor (stack) was pulverized into powder. The powder was analyzed by XRD.

As a result, shift of the peak position of Ni was confirmed. It is seen from this that metal A in the internal electrode is present in the form of an alloy with Ni.

(5) Confirmation of Metal A Distribution in Internal Electrode (5-1) Preparation of Samples for Confirmation of Metal A Distribution In a WT cross section at a position of approximately a half in the L direction of the fired multilayer ceramic capacitor (stack), a central portion in the W direction of each of three regions was processed by the microsampling method with FIB into flake samples to be subjected to analysis. The three regions are a central region in the thickness (T) direction, and respective regions near upper and lower external layer portions (ineffective portions) (upper region and lower region), in the region where the internal electrodes of the sample are stacked.

The flake sample was processed to have a thickness of 60 nm or less. A damaged layer in a sample surface that was formed during the FIB process was removed by Ar ion milling.

In processing the sample to be subjected to analysis, SMI3050SE (manufactured by Seiko Instruments Inc.) was used for the FIB, and PIPS (manufactured by Gatan, Inc.) was used for the Ar ion milling.

(5-2) Analysis

Then, the sample prepared in the above-described manner was observed with a STEM (scanning transmission electron microscope), and four different internal electrodes were selected from each region in the sample.

Moreover, five portions of interfaces each located between the ceramic element and the internal electrode and substantially perpendicular to the cross section of the flake sample (main surface of the flake sample) were searched for (five portions for each of the aforementioned four internal electrodes).

Then, in the internal electrode abutting on the interface substantially perpendicular to the cross section, analysis was conducted for a region (near-interface region) located in the internal region and at 2 nm from the interface in the direction (stack direction) perpendicular to the interface which was substantially perpendicular to the cross section, and also conducted for a central region in the thickness direction. The analysis was conducted for the near-interface region and the central region in the thickness direction in the same internal electrode.

It should be noted that the aforementioned interface substantially perpendicular to the cross section of the flake sample was searched for in the following way. First, respective lines appearing at the opposite sides of the interface, namely Fresnel fringes were observed with a STEM. The focus was changed. Then, an interface where the contrast of the Fresnel fringe varies at the opposite sides in a substantially symmetrical manner was searched for. The found interface was identified as being substantially perpendicular to the cross section of the flake sample.

Moreover, for the STEM analysis, JEM-2200FS (manufactured by JEOL Ltd.) was used as the STEM. The acceleration voltage was set to 200 kV.

As a detector, an SDD with a sensing area of 60 mm$^2$ of JED-2300T was used. As an EDX system, Noran System 7 (manufactured by Thermo Fisher Scientific Inc.) was used.

Then, quantitative analysis of Ni and metal A was conducted by means of an EDX (energy-dispersive X-ray spectrometer) at 60 points in total, namely 5 points x four internal electrodes in each of three regions which are the aforementioned upper region, central region, and lower region, in each of the near-interface region and the central region in the thickness direction. The measurement probe diameter for an electron beam was about 1 nm and the measurement time was 30 seconds. As quantitative correction from the obtained EDX spectrum, Cliff-Lorimer correction was used. The mapping time was three hours.

Then, from the results of the quantitative analysis of Ni and metal A at the aforementioned 20 points, the ratio X (atomic percent) of metal A in the near-interface region of the internal electrode and the ratio Y (atomic percent) of metal A in the central region in the thickness direction were examined. The results of this are shown in Table 1.

Moreover, from respective values of X and Y examined in the above-described manner, X−Y was determined. The results of this are shown in Table 1.

TABLE 1

| sample No. | kind of metal A | ratio of A (mass %) | X (at. %) | Y (at. %) | X − Y | electrostatic capacity (µF) | MTTF (hr) |
|---|---|---|---|---|---|---|---|
| 1* | — | — | — | — | — | 5.12 | 101 |
| 2 | In | 1 | 3.2 | 0.3 | 2.9 | 5.11 | 192 |
| 3 | In | 1 | 2.1 | 0.4 | 1.7 | 5.12 | 145 |
| 4* | In | 1 | 0.4 | 0.3 | 0.1 | 4.83 | 100 |
| 5 | Ga | 1 | 2.6 | 0.4 | 2.2 | 5.11 | 188 |
| 6 | Ga | 1 | 1.4 | 0.3 | 1.1 | 5.12 | 173 |
| 7* | Ga | 1 | 0.5 | 0.3 | 0.2 | 4.88 | 103 |
| 8 | Zn | 1 | 2.8 | 0.3 | 2.5 | 5.09 | 177 |
| 9 | Zn | 1 | 1.4 | 0.4 | 1.0 | 5.08 | 123 |
| 10* | Zn | 1 | 1.2 | 0.3 | 0.9 | 4.93 | 111 |
| 11 | Pb | 1 | 2.5 | 0.3 | 2.2 | 5.09 | 186 |
| 12 | Bi | 1 | 2.4 | 0.3 | 2.1 | 5.08 | 191 |

As shown in Table 1, it was confirmed that the samples with sample numbers 1, 4, 7, and 10 (samples as comparative examples) failing to satisfy the requirements of the present invention exhibited small values of MTTF and thus low reliability.

It was confirmed that the sample with sample number 1 (sample as a comparative example) having the internal electrode failing to contain metal A exhibited a small value of MTTF and thus low reliability.

Among the samples of the comparative examples, it was confirmed that the samples with sample numbers 4, 7, and 10 (samples as comparative examples) containing metal A but failing to satisfy the requirements in terms of the difference between value X of atomic percent of A in the near-interface region and value Y of atomic percent of A in the central region in the thickness direction exhibited small values of the obtainable electrostatic capacitance.

In contrast, it was confirmed that the multilayer ceramic capacitors (samples with sample numbers 2, 3, 5, 6, 8, 9, 11, 12) satisfying the requirements of the present invention (namely: at least one kind of metal A selected from the group consisting of In, Ga, Zn, Bi, and Pb is dissolved in Ni to form a solid solution; the internal electrode has a ratio of A of 1.4 atomic percent or more to a total amount of A and Ni in a near-interface region located to a depth of 2 nm from a surface of the internal electrode, the surface being a surface facing a corresponding ceramic dielectric layer; and a relation between value X of atomic percent of A in the near-interface region and value Y of atomic percent of A in the central region in a thickness direction of the internal electrode satisfies a relation expressed by X−Y≥1.0) exhibited large values of MTTF and thus improved reliability.

The reason for this is considered as the fact that the alloying of Ni-A in the near-interface region of the internal electrode caused change of the state of the interface between the ceramic dielectric layer and the internal electrode.

Moreover, it was confirmed that the multilayer ceramic capacitor satisfying the requirements of the present invention exhibited improvement of the electrostatic capacitance.

The reason for this is considered as follows. The concentration of metal A was higher in the near-interface region of the internal electrode than in the internal region of the internal electrode (central region in the thickness direction), and therefore, the state of distribution of the residual stress in the multilayer ceramic capacitor was changed.

It should be noted that the interface between the internal electrode and the ceramic dielectric layer may contain any element contained in the ceramic dielectric layer or the internal electrode, besides Ni and metal A.

Moreover, in a part of the interface between the ceramic dielectric layer and the internal electrode, a different phase made up of elements other than Ni and metal A may be present.

Moreover, the internal electrode may contain, as a co-material, a ceramic material similar in characteristics to the ceramic material forming the ceramic dielectric layer. Specifically, as the co-material, a ceramic material having the same composition as the ceramic material forming the ceramic dielectric layer, a ceramic material in which some of the constituent elements of the ceramic material forming the ceramic dielectric layer are absent, a ceramic material in which a part of the constituent elements is different from the ceramic material forming the ceramic dielectric layer, a ceramic material identical to the ceramic material forming the ceramic dielectric layer in constituent elements and different from the ceramic material forming the ceramic dielectric layer in ratio between the constituent elements, or the like can be used.

The present invention is not limited to the above-described embodiment in other respects as well, and various variations and modifications are possible within the scope of the present invention, in terms for example of the number of layers of the ceramic dielectric layers and/or the internal electrodes forming the ceramic stack.

REFERENCE SIGNS LIST

1 multilayer ceramic capacitor
2 ceramic dielectric layer
3, 4 internal electrode
5 ceramic stack
6, 7 external electrode
L length
T thickness
W width

The invention claimed is:
1. A multilayer ceramic capacitor comprising:
a ceramic stack having a plurality of stacked ceramic dielectric layers and a plurality of internal electrodes, each of the plurality of internal electrodes being interposed between adjacent ceramic layers of the plurality of ceramic dielectric layers; and
an external electrode on an outer surface of the ceramic stack and electrically connected to the internal electrodes,
the internal electrodes containing a solid solution of a Ni-A alloy, wherein A is at least one kind of metal selected from the group consisting of In, Ga, Zn, Bi, and Pb,
each internal electrode of the plurality of internal electrodes having a first region thereof located from a surface of the internal electrode to a depth of 2 nm therefrom, the surface of the internal electrode being a surface facing a corresponding one of the plurality of ceramic dielectric layers,

X−Y≥1.0, wherein X is a first atomic percent representing a ratio of A in the first region to a total amount of A and Ni in the first region, and X is 1.4 atomic percent or more, and Y is a second atomic percent representing a ratio of A in a second region of the internal electrode outside of the first region.

2. The multilayer ceramic capacitor according to claim 1, wherein a ratio of A to a total amount of Ni and A in the Ni-A alloy is 1 mass %.

3. The multilayer ceramic capacitor according to claim 1, wherein the second region is located at 0.2T or more inward from each of opposed surfaces of the internal electrode, and T is a thickness of the internal electrode.

4. A method of manufacturing a multilayer ceramic capacitor, the method comprising:
forming a un-fired ceramic stack having a plurality of un-fired ceramic dielectric layers and a plurality of un-fired internal electrode patterns, the plurality of un-fired internal electrode patterns being formed by applying an electrically conductive paste containing an Ni component and at least one kind of metal A component selected from the group consisting of In, Ga, Zn, Bi, and Pb, the plurality of un-fired internal electrode patterns being disposed along a respective plurality of interfaces between the un-fired ceramic dielectric layers;
firing the un-fired ceramic stack to obtain a fired ceramic stack having ceramic dielectric layers and internal electrode layers; and
annealing the fired ceramic stack under a predetermined condition to increase a ratio of A in a first region located from a surface of the internal electrode to a depth of 2 nm therefrom, the surface of the internal electrode being a surface facing a corresponding one of the ceramic dielectric layers.

5. The method of manufacturing a multilayer ceramic capacitor according to claim 4, wherein:

$X-Y \geq 1.0$,

X is a first atomic percent representing the ratio of A in the first region to a total amount of A and Ni in the first region, and X is 1.4 atomic percent or more, and Y is a second atomic percent representing a ratio of A in a second region of the internal electrode outside of the first region.

6. The method of manufacturing a multilayer ceramic capacitor according to claim 5, wherein a ratio of A to a total amount of Ni and A in the Ni-A alloy is 1 mass %.

7. The method of manufacturing a multilayer ceramic capacitor according to claim 5, wherein the second region is located at 0.2T or more inward from each of opposed surfaces of the internal electrode, and T is a thickness of the internal electrode.

8. The method of manufacturing a multilayer ceramic capacitor according to claim 7, wherein the external electrode is formed by applying and baking a conductive paste on the at least one end of the fired ceramic stack.

9. The method of manufacturing a multilayer ceramic capacitor according to claim 4, the firing is conducted in a reducing atmosphere of H2-N2-H20 gas at an oxygen partial pressure of $10^{-10}$ to $10^{-12}$ MPa, a temperature of the firing is raised at a rate of 20° C./min and the un-fired ceramic stack is fired at 1200° C. for 20 minutes.

10. The method of manufacturing a multilayer ceramic capacitor according to claim 4, wherein the predetermined condition of the annealing is an oxygen partial pressure of $10^{-12}$ to $10^{-15}$ MPa and a temperature of 800 to 1000° C. for one to four hours.

11. The method of manufacturing a multilayer ceramic capacitor according to claim 4, further comprising forming an external electrode that is electrically connected to the internal electrodes on at least one end of the fired ceramic stack.

* * * * *